United States Patent
Renold

[15] 3,669,331
[45] June 13, 1972

[54] FREE FLOATING PRESSURE ROLLER MEANS AND RETRACTING MECHANISM FOR FILM DRIVE

[72] Inventor: Walter Renold, 7044 Mary Ellen Avenue, Hollywood, Calif. 91605

[22] Filed: March 4, 1971

[21] Appl. No.: 120,965

[52] U.S. Cl. .............................. 226/176, 226/187, 226/183
[51] Int. Cl. ....................................................... G11b 15/29
[58] Field of Search .......................... 226/183, 187, 176, 177

[56] References Cited

UNITED STATES PATENTS 2,858,130   10/1958   Baur et al. ............................. 226/183

*Primary Examiner*—Allen N. Knowles
*Attorney*—Pastoriza & Kelly

[57] ABSTRACT

Slippage of a wide film engaged by a driving capstan is prevented by resiliently urging a pair of rollers mounted in a free floating yoke structure against the drive capstan. The yoke structure is guided by a frame means which also includes cam means for effecting the urging of the yoke structure. A lever element terminating in a hook is arranged to engage a bearing on the free end of the capstan to stabilize the same when the pressure rollers are in engagement with the capstan.

5 Claims, 1 Drawing Figure

PATENTED JUN 13 1972 3,669,331
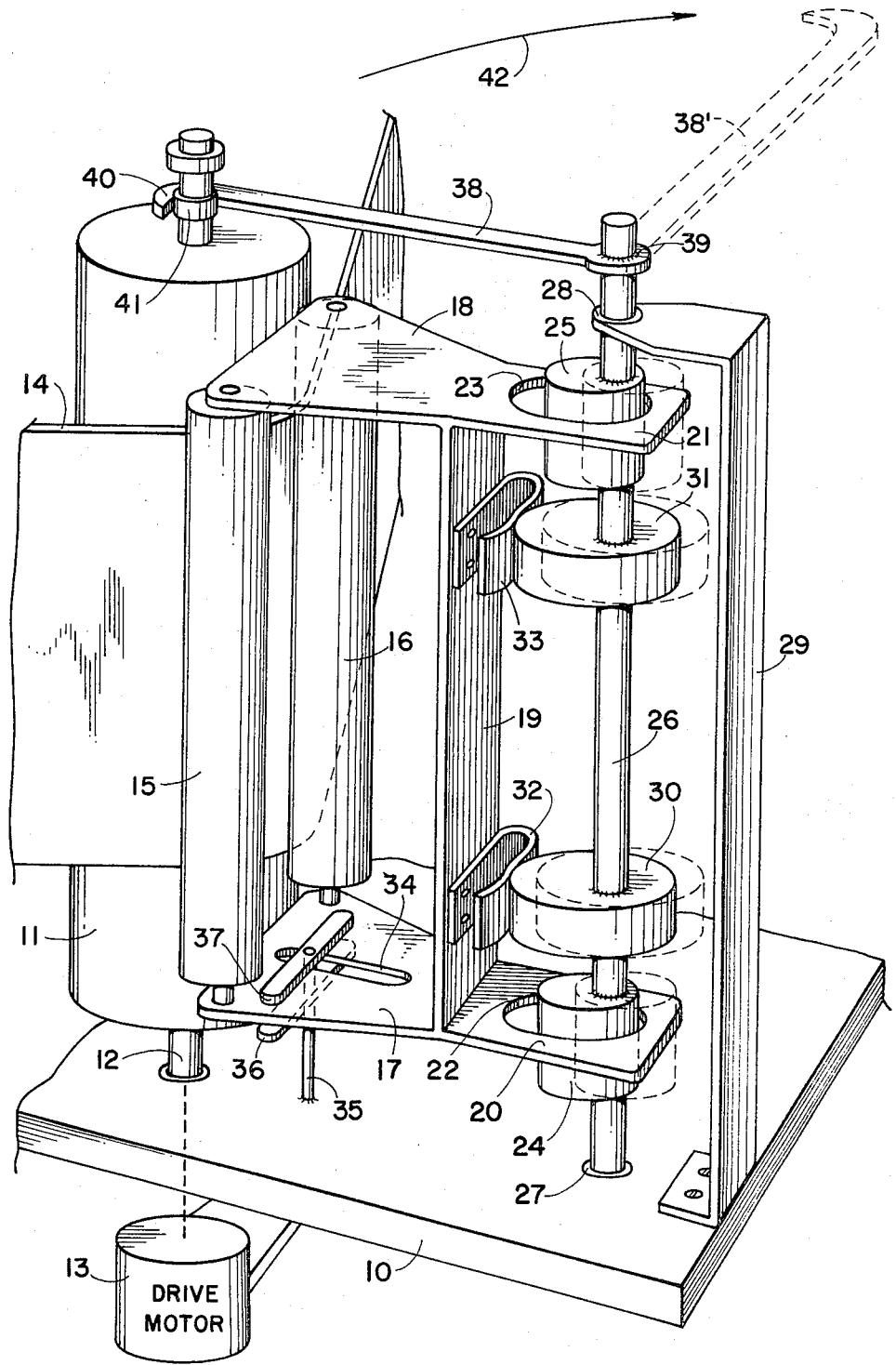
INVENTOR.
WALTER RENOLD
BY Pastoriza & Kelly
ATTORNEYS

FREE FLOATING PRESSURE ROLLER MEANS AND RETRACTING MECHANISM FOR FILM DRIVE

This invention relates to drive capstans for tape or film and more particularly to an improved pressure roller means cooperating with a drive capstan for minimizing film slippage on the capstan.

BACKGROUND OF THE INVENTION

In certain microfilm applications, very accurate film registration is required, yet the conventional methods for precision film positioning using sprocket holes cannot be applied. This is because the film itself is normally not provided with sprocket holes. In the particular situation in which step-and-repeat cameras are used, it is desirable to move the same strip of wide film back and forth many times as rows of small images are exposed. Such necessary movements accentuate the difficulties encountered by film slippage to such an extent that the problem is presently side-stepped in existing cameras by changing the conventional sequence of exposed images and simply moving the whole mechanism or optics back and forth laterally in a step-and-repeat fashion, the film transport only advancing the film in a forward direction by one step at a time at the conclusion of exposing a column of images.

The foregoing method of film exposure seriously restricts the usefulness of such a camera. Further, the conventional pressure roller and drive capstan arrangements typically can only operate within a very narrow range of applied pressure and at limited drive speeds. Too little pressure will cause film slippage while too much pressure will cause so called pressure marks on the photographic emulsion which have the appearance of exposed streaks.

Another problem encountered in such cameras as described above is the space limitation within which a satisfactory roller mechanism must be mounted. Such mechanism includes arrangements for engaging and disengaging the pressure rollers from the drive capstan in order to permit film loading.

Similar problems are present in many other mechanisms in which unperforated film is driven.

BRIEF DESCRIPTION OF THE PRESENT INVENTION

With the above in mind, the present invention provides a pressure roller means for engagement against a drive capstan for moving film therebetween in which the film and drive roller contact is distributed over a large area thereby permitting larger contact force with relatively small unit pressure on the film. As a consequence, the problems associated with too little or too much pressure are avoided and the risk of slippage is minimized.

In accord with the invention, a yoke structure rotatably mounts as least two pressure rollers with their axes of rotation parallel to each other, the spacing between the rollers being less than the diameter of the drive capstan. A frame means in turn includes guiding means permitting free limited movement of the yoke structure in all six degrees of freedom such that the yoke structure is free floating relative to the frame means. A resilient means is connected to the yoke structure and is arranged to cooperate with an actuating means on the frame means to urge the pressure rollers against the capstan such that the reaction force components transmitted to the supported ends of the pressure rollers in the yoke structure are substantially equal.

In the preferred embodiment of the invention, the actuating means takes the form of cam means including a cam shaft mounted in the frame means for rotation about an axis generally parallel to the axes of the pressure rollers. First and second pairs of cam members are eccentrically mounted to the shaft. The first pair of cam members engages the resilient means on the yoke structure to cause the pressure rollers to engage the driving capstan when the cam shaft is rotated from a first position to a second position. The second pair of cam members are arranged to engage the yoke structure itself and retract it from the driving capstan when the cam shaft is rotated from the second position back to the first position. By this arrangement, the film may be loaded into position or removed very quickly and the entire pressure roller mechanism still is kept in a compact configuration.

An important feature of the invention resides in the provision of a lever element secured to the frame means and terminating in a hook for engaging the free end of the drive capstan when the pressure rollers engage the capstan. A stability is thus provided during the film driving operation.

BRIEF DESCRIPTION OF THE DRAWING

A better understanding of the invention will be had by referring to the single accompanying drawing constituting a perspective view of one embodiment of the invention.

DETAILED DESCRIPTION OF THE INVENTION

Referring to the drawing, there is shown a fragmentary portion of a frame means 10 which may include a support for a driving capstan 11 mounted on a capstan shaft 12 passing through a suitable bearing in the frame to a drive motor 13. A wide film 14 is shown partially wrapped about the drive capstan 11.

In order to hold the film 14 against the drive capstan 11 to insure proper driving of the film without slippage, the improved pressure roller means of the present invention is utilized. As shown, this means includes at least two pressure rollers 15 and 16 rotatably mounted between a pair of yoke arms 17 and 18 constituting part of a yoke structure 19. It will be noted that the shafts for the pressure rollers 15 and 16 are parallel and the spacing between the rollers is less than the diameter of the driving capstan 11 so that engagement of the driving capstan by both rollers simultaneously is assured when the yoke structure is moved towards the capstan.

The yoke arms themselves include rearwardly extending portions 20 and 21 provided with elongated slots 22 and 23. Positioned within these slots is a pair of cam members 24 and 25 eccentrically mounted to a cam shaft 26. Cam shaft 26 in turn is mounted for rotation in frame structure 10 as shown at 27 for the lower end of the cam shaft and at 28 on the end of bracket 29 at the upper end of the cam shaft.

A pair of larger cam members 30 and 31 are also eccentrically mounted on the cam shaft 26 in a manner to engage resilient springs 32 and 33 mounted on the yoke structure 19 when the cam shaft 26 is rotated from a first to a second position.

It will be evident from the positioning of the slots 22 and 23 in the yoke structure that the entire yoke structure is free to move towards the capstan through engagement of the resilient springs 32 and 33. On the other hand, when the cam shaft 26 is rotated from its referred to second position back to its first position, the cam members 24 and 25 will engage the far ends of the slots 22 and 23 and thus urge the entire yoke structure away from the drive capstan 11.

In accord with an important feature of this invention, the yoke structure is free floating; that is, the frame includes suitable guide means which will permit limited motion of the yoke structure in its six degrees of freedom. As an example of such a guide means, there is shown a slot 34 in the yoke arm 17 of the yoke structure through which passes a fixed pin 35 from the frame 10. Suitable cross members 36 and 37 in turn are secured to the pin on either side of the slot 34 and spaced a greater distance apart than the thickness of the yoke arm 17. It will thus be seen that slight up and down as well as lateral movement of the yoke structure is possible as well as inward and outward movement towards and away from the capstan and yet the yoke is captured to the frame 10 through the loose guide coupling described.

The mechanism is completed by a lever element 38 having one end secured as at 39 to the upper end of the cam shaft 26. The other end of the element 38 terminates in a hook means 40 arranged to engage about a bearing 41 on the upper end of the drive capstan shaft 12 when the cam shaft 26 is rotated from its first to its second position. This lever 38 serves to stabilize the drive capstan since this capstan is relatively long and is only rotatably supported by the frame 10 at its lower end. A long capstan is necessary to accommodate relatively wide types of film involved.

In the foregoing arrangement, only a very light structure is required for lever 38 to give substantial support to the drive capstan, because the force exerted against the capstan by the pressure rollers along a line of action between the axes of shafts 12 and 26 is opposed by the lever 38 in tension along the same line of action.

OPERATION

In operation, the lever element 38 is swung in the direction of the arrow 42 to its dotted line position 38'. This action not only releases the upper end of the drive capstan 11 but simultaneously retracts the yoke structure 19 and thus the rollers 15 and 16 from the drive capstan. In this respect, and as described heretofore, the cam members 24 and 25 rotate with the cam shaft 26 in the slots 22 and 23 and because of the eccentric mounting, the desired retraction of the yoke structure takes place. It will also be appreciated that simultaneously with this same motion, the cam members 30 and 31 are rotated thus relieving pressure against the resilient springs 32 and 33.

With the yoke structure and pressure rollers retracted from the drive capstan 11, film such as 14 may be readily inserted or removed.

When it is desired to drive the film, it will be inserted and the lever 38 simply swung from its dotted line position shown to its initial position, the hook means 40 engaging about the bearing 41 at the upper end of the drive capstan shaft 12. This action simultaneously releases the yoke structure through the eccentric cam members 24 and 25 permitting movement of the yoke structure towards the drive capstan. The eccentric cam members 30 and 31 simultaneously engage the resilient springs 32 and 33 thus urging the yoke structure and the pressure rollers 15 and 16 into engagement against the drive capstan 11 with the film 14 sandwiched therebetween. Because of the "free floating" arrangement of the yoke structure and because of the stabilization of the upper end of the drive capstan shaft 12 by the lever 38, the reaction force components on the upper and lower ends of the rollers at the points they are mounted to the yoke will be substantially equal and uniform pressure will be applied to the film. Moreover, the use of the two rollers as illustrated causes a relatively large area of the film 14 to be in frictional engagement with the surface of the capstan roller 11. This large area surface engagement takes place over the entire inside area of the film between its engagement points by the rollers 15 and 16 respectively. Thus a relatively large "pinching" force may be applied to the film by the pressure rollers and yet the unit pressure can be kept relatively small because of the large area distribution As already mentioned, the "free floating" arrangement of the yoke assures an automatic self alignment of the axes of the rollers with the axis of the drive capstan so that there is an even distribution of forces all along the contact portions of the rollers.

Finally, it will be evident that because of the particular actuating means in the form of the cam shaft 26 and associated eccentrically mounted cam members a relatively compact arrangement can be realized. It should be understood that the particular showing in the drawing is not in the same proportion as would be an actual embodiment in order that the component parts may be clearly illustrated. In an actual embodiment, the axis of the cam shaft 26 would be disposed considerably closer to the rollers 15 and 16 and the yoke arms 17 and 18 and associated rearwardly extending portions 20 and 21 would be considerably shorter.

In its broadest aspect, it would also be possible to utilize one centered cam member rather than the cam members 30 and 31 on the shaft 26, referred to in the appended claims as a first cam member since it is only essential to the invention that the yoke be resiliently symmetrically urged towards the drive capstan. The same is true of the additional cam members 24 and 25 referred to in the appended claims as a second cam member. By utilizing the second cam member or the pair as shown cooperating with the slots 22 and 23 in the yoke structure, the feature of simultaneous retraction of the entire mechanism in response to rotation of the lever for easy insertion or removal of film is realized. It should also, of course, be understood that although the invention has been described with respect to film the principles are clearly applicable to tape or any other type of strip media which normally is not provided with sprocket holes for driving purposes.

Finally, while the description and claims refer to a yoke structure for supporting the pressure rollers, it is to be understood that such terminology is meant to cover any equivalent type of mounting or supporting frame for supporting the rollers.

The invention, accordingly, is not to be thought of as limited to the particular embodiment shown and described for illustrative purposes.

What is claimed is:

1. A pressure roller means for engagement against a drive capstan for moving film passing therebetween comprising, in combination:
   a. a yoke structure;
   b. at least two pressure rollers rotatably mounted in said yoke structure with their axes of rotation parallel to each other, the spacing between said rollers being less than the diameter of said capstan;
   c. frame means including guiding means permitting free limited movement of said yoke structure in all six degrees of freedom such that said yoke structure is free floating relative to said frame means;
   d. resilient means; and
   e. actuating means on said frame means cooperating with said resilient means to urge said pressure rollers against said capstan whereby the reaction force components transmitted to the supported end of said pressure rollers in said yoke structure are substantially equal.

2. The subject matter of claim 1, in which said actuating means includes cam means for engaging said resilient means.

3. The subject matter of claim 2 in which said cam means includes a cam shaft mounted in said frame means for rotation about an axis generally parallel to the axes of said pressure rollers; and a first cam member on said cam shaft for engaging said resilient means when said cam shaft is rotated from a first position to a second position.

4. The subject matter of claim 3, including a second cam member for engaging said yoke structure and urging the same away from said drive capstan in response to rotation of said cam shaft from said second position back to said first position.

5. The subject matter of claim 4, in which said drive capstan is driven from one end leaving the other end free; a bearing on said other end, said actuating means including a lever element secured at one end to said cam shaft and extending laterally therefrom, the other end of said lever element terminating in a hook means for engaging said bearing on the other free end of said drive capstan when said cam shaft is rotated to said second position to thereby stabilize said drive capstan while said pressure rollers are engaging the same.

* * * * *

UNITED STATES PATENT OFFICE
CERTIFICATE OF CORRECTION

Patent No. 3,669,331          Dated June 13, 1972

Inventor(s) Walter Renold

It is certified that error appears in the above-identified patent and that said Letters Patent are hereby corrected as shown below:

Column 4, line 44

Change "end" to --ends--.

Signed and sealed this 26th day of September 1972.

(SEAL)
Attest:

EDWARD M. FLETCHER, JR.          ROBERT GOTTSCHALK
Attesting Officer                Commissioner of Patents